United States Patent
Schulz

(10) Patent No.: US 7,820,039 B2
(45) Date of Patent: Oct. 26, 2010

(54) APPARATUS FOR THE CONTINUOUS FILTERING OF IMPURITIES FROM A FLOWABLE COMPOUND

(76) Inventor: Helmuth Schulz, Hirschgasse 16/12, A 4020 Linz, Österreich (AT)

( * ) Notice: Subject to any disclaimer, the term of this patent is extended or adjusted under 35 U.S.C. 154(b) by 0 days.

(21) Appl. No.: 12/310,930

(22) PCT Filed: Sep. 12, 2007

(86) PCT No.: PCT/AT2007/000431

§ 371 (c)(1),
(2), (4) Date: Jul. 8, 2009

(87) PCT Pub. No.: WO2008/031127

PCT Pub. Date: Mar. 20, 2008

(65) Prior Publication Data

US 2010/0006492 A1    Jan. 14, 2010

(30) Foreign Application Priority Data

Sep. 13, 2006    (AT) ............................... A 1521/2006

(51) Int. Cl.
*B01D 33/46* (2006.01)
*B01D 33/70* (2006.01)

(52) U.S. Cl. ................. 210/107; 210/396; 210/374; 210/354; 210/355; 210/357; 210/402; 210/404

(58) Field of Classification Search ................ 210/217, 210/323.1, 107, 225
See application file for complete search history.

(56) References Cited

U.S. PATENT DOCUMENTS

| | | | |
|---|---|---|---|
| 1,266,133 A * | 5/1918 | McCaskell ................. 210/122 |
| 2,038,921 A * | 4/1936 | George Blaufuss ......... 210/397 |
| 2,899,066 A * | 8/1959 | Peterson et al. ............ 210/383 |
| 4,470,904 A * | 9/1984 | Gail et al. .................. 210/103 |
| 5,498,334 A | 3/1996 | Gneuss |

(Continued)

FOREIGN PATENT DOCUMENTS

DE        42 40 461         12/1993

(Continued)

OTHER PUBLICATIONS

International Search Report.

*Primary Examiner*—Krishnan S Menon
*Assistant Examiner*—Allison Gionta
(74) *Attorney, Agent, or Firm*—Collard & Roe, P.C.

(57) ABSTRACT

The invention relates to an apparatus for the continuous filtering of impurities from a flowable compound, especially a plastic melt, comprising a filter insert (3) in the form of a hollow rotary body which is held to rotate about its rotational axis (A) relative to a housing (1, 2) and is flowed through by the flowable compound and which is arranged in a flow conduit of the housing (1, 2) between a feed conduit (7) for the compound to be filtered and a discharge conduit (8) for the filtered compound, and a discharge apparatus for impurities held back by the filter, which apparatus comprises a feed screw (9) cooperating with the filter insert (3). In order to provide advantageous constructional conditions it is proposed that the filter insert (3) comprises a disk-like filter (5) which is arranged on the face side of the rotary body and is coaxial to the rotational axis (A).

4 Claims, 2 Drawing Sheets

U.S. PATENT DOCUMENTS

| | | | |
|---|---|---|---|
| 5,988,865 A * | 11/1999 | Bacher et al. | 366/76.93 |
| 6,149,716 A * | 11/2000 | Bach et al. | 95/280 |
| 6,227,380 B1 * | 5/2001 | Bacher et al. | 210/408 |
| 7,124,895 B2 | 10/2006 | Ettlinger | |
| 2005/0161391 A1 | 7/2005 | Ettlinger | |

FOREIGN PATENT DOCUMENTS

| | | |
|---|---|---|
| DE | 197 47 016 | 5/1999 |
| DE | 199 16 539 | 10/2000 |
| DE | 20 2004 020 442 | 7/2005 |
| EP | 0 655 268 | 5/1995 |
| GB | 532 134 | 1/1941 |
| WO | WO 96/38214 | 12/1996 |
| WO | WO 2004/002715 | 1/2004 |

* cited by examiner

APPARATUS FOR THE CONTINUOUS FILTERING OF IMPURITIES FROM A FLOWABLE COMPOUND

CROSS REFERENCE TO RELATED APPLICATIONS

This application is the National Stage of PCT/AT2007/000431 filed on Sep. 12, 2007, which claims priority under 35 U.S.C. §119 of Austrian Application No. A 1521/2006 filed on Sep. 13, 2006. The international application under PCT article 21(2) was not published in English.

FIELD OF THE INVENTION

The invention relates to an apparatus for the continuous filtering of impurities from a flowable compound, especially a plastic melt, comprising a filter insert in the form of a hollow rotary body which is held to rotate about its rotational axis relative to a housing and is flowed through by the flowable compound and which is arranged in a flow conduit of the housing between a feed conduit for the compound to be filtered and a discharge conduit for the filtered compound, and a discharge apparatus for impurities held back by the filter, which apparatus comprises a feed screw cooperating with the filter insert.

DESCRIPTION OF THE PRIOR ART

Such apparatuses are used to remove impurities in an economical way from plastic materials, especially plastic materials to be recycled, prior to their further processing. This mixture to be prepared comprises impurities to be filtered out such as adhesive tapes, labels, aluminum lids and the like, with a separation of such residues by utilizing different specific densities, especially smaller impurities, only being possible with difficulty. An aggravating factor is that the degree of contamination with impurities can be very high, which substantially increases the cleaning effort and obviously places a considerable burden on the provided filters. That is why the plastic material is first molten after coarse cleaning and subsequently conveyed through the apparatus. For the filtering of strongly contaminated compounds, it is known to provide these initially mentioned apparatuses (WO 2004/002715 A). A filter body which rotates in a housing and is provided on the jacket side with perforations is used as a filter insert, which filter body retains the impurities depending on the size of the bore holes, which impurities are scraped off from the inflow side of the filter insert by means of a scraper forming the discharge apparatus and are removed by means of the feed screw from the housing. The bore holes of such filters are produced for example by means of electron rays or by means of laser and are usually clamped onto the cylindrical support body or fixed thereto. The disadvantageous aspect in this known construction is that it is difficult after a filtering process to remove the filter insert from the housing with the usual tools, as is regularly required for the purpose of a repair or a replacement. Such an exchange is mostly only possible with much effort, with the filter insert usually being destroyed. A further disadvantage is that for servicing such apparatuses one must accept relatively long standstill periods and that such filters are comparatively expensive.

A further apparatus for cleaning a melt is disclosed by DE 42 40 461 C1, according to which the filters are exchangeably held in a disk which exchangeably receives the filter elements in recesses arranged on a circular orbit. The individual filters are thus arranged in the manner of a drum magazine, thus offering the possibility of continually introducing new filters into the flow duct which is flowed through by the melt, such that the disk is further rotated by an angular offset between two filter inserts. Continuous cleaning of the filter inserts is not provided for.

SUMMARY OF THE INVENTION

The invention is based on the object of providing an apparatus of the kind mentioned above which avoids the mentioned disadvantages and which allows rapid and easy exchange of filters in combination with the simplest possible construction, thus enabling a high degree of cleaning of the compound.

This object is achieved by the invention in such a way that the filter insert comprises a disk-like filter which is arranged on the face side of the rotary body and is coaxial to the rotational axis.

The relevant advantage of the invention is that a filter insert arranged in accordance with the invention can be mounted or dismounted easily in the housing and that such disk-like filters can be produced especially easily and cost-effectively. These disk-like filters can be provided with an integral arrangement or in several parts, are fastened to the filter support arranged as a rotary body and the filter insert is then inserted into the housing. The filters are mounted by means of screwed joints or suitable clamping apparatuses on the support body. It is principally possible to have the filter insert rotate against the discharge apparatus in the housing. It can optionally also be provided to arrange the discharge apparatus to rotate about the rotational axis of the rotary body. Since the filters are always directly exposed and accessible as a result of their design after opening the housing, the invention always enables a rapid and smooth exchange of filters. There is no likelihood of any gluing of the filter insert in the housing after a curing of the plastic melt which would have a strong influence on the removal of the filter insert from the housing.

The simplest of constructional conditions are obtained when the filter insert is held in a rotationally driven way in the housing with a disk plane arranged perpendicular to the rotational axis of the rotary body. The discharge apparatus cooperates with the filter in such a way that the filter surface is continuously moved past the discharge apparatus as a result of the rotary drive, with impurities retained by the filter being removed continuously from the apparatus by the discharge apparatus.

In order to increase the cleaning effect of the discharge apparatus, it can comprise at least one scraper which is arranged behind the feed screw in the direction of rotation of the filter insert and pressed against the filter, this being in addition to the at least one feed screw which is arranged with its rotational axis preferably parallel to the disk plane. It is possible to provide both one scraper and/or discharge screw as well as several thereof, which combine with each other to form the discharge apparatus. The direction of rotation of the discharge screw can either be in the same direction relative to the direction of rotation of the filter insert or in the opposite direction thereof, depending on the operational conditions.

When the feed conduit for the compound to be filtered opens into a ring conduit which guides the filtrate to the filter and tapers towards the filter in the direction of rotation of the filter insert, i.e. in the direction of rotation towards the feed screw, it is ensured that always the largest possible filtering surface area is available for filtering and an increased filtering pressure on the filter and thus a certain forced pressing of the compound through the filter is ensured by the rotational movement of the filter insert against the ring conduit and as a result of the frictional forces prevailing between filter, compound and ring conduit.

In order to enable performing a rapid change of filters, it is recommended to arrange the housing with at least two housing parts that are detachably connected with each other, with one housing part receiving the filter insert and the other housing part the discharge apparatus. The two housing parts can be separated rapidly from each other by opening the locking elements, whereupon all parts subject to wear and tear are directly exposed for servicing purposes. The filters can then be exchanged or serviced, optionally without having to remove the filter insert. Moreover, the other housing part with the scraper and the discharge screw can be serviced in a simple way because the individual components are already accessible directly after the separation of the two housing parts and need not be removed in a cumbersome way.

The screw arranged parallel to the filter disk receives the material scraped off by the scraper and guides it out of the housing. The screw can be provided with a large variety of profiles. Optionally, the screw itself is arranged as a scraper and, in order to ensure sufficient scraping effect, is arranged with increased lead and optionally with multiple threads. A screw with a scraper edge with a scraping angle of 90° for example is mentioned here by way of example.

If the smallest possible wear and tear of the screw is to be ensured, it should rotate relative to the screen disk in a contactless manner. In this case, the scraping is ensured by the at least one scraper, for which a pressing device can be provided which presses against the filter. Said pressing device comprises springs or hydraulic actuators for example. When providing a scraper it needs to be noted however that the dead space between screw and scraper is kept as small as possible. That is why it may be advantageous when the scraper already forms a part of the screw housing.

BRIEF DESCRIPTION OF THE DRAWINGS

The invention is now explained in closer detail by reference to an embodiment shown schematically in the drawings, wherein.

DESCRIPTION OF THE PREFERRED EMBODIMENT

Figure 1:
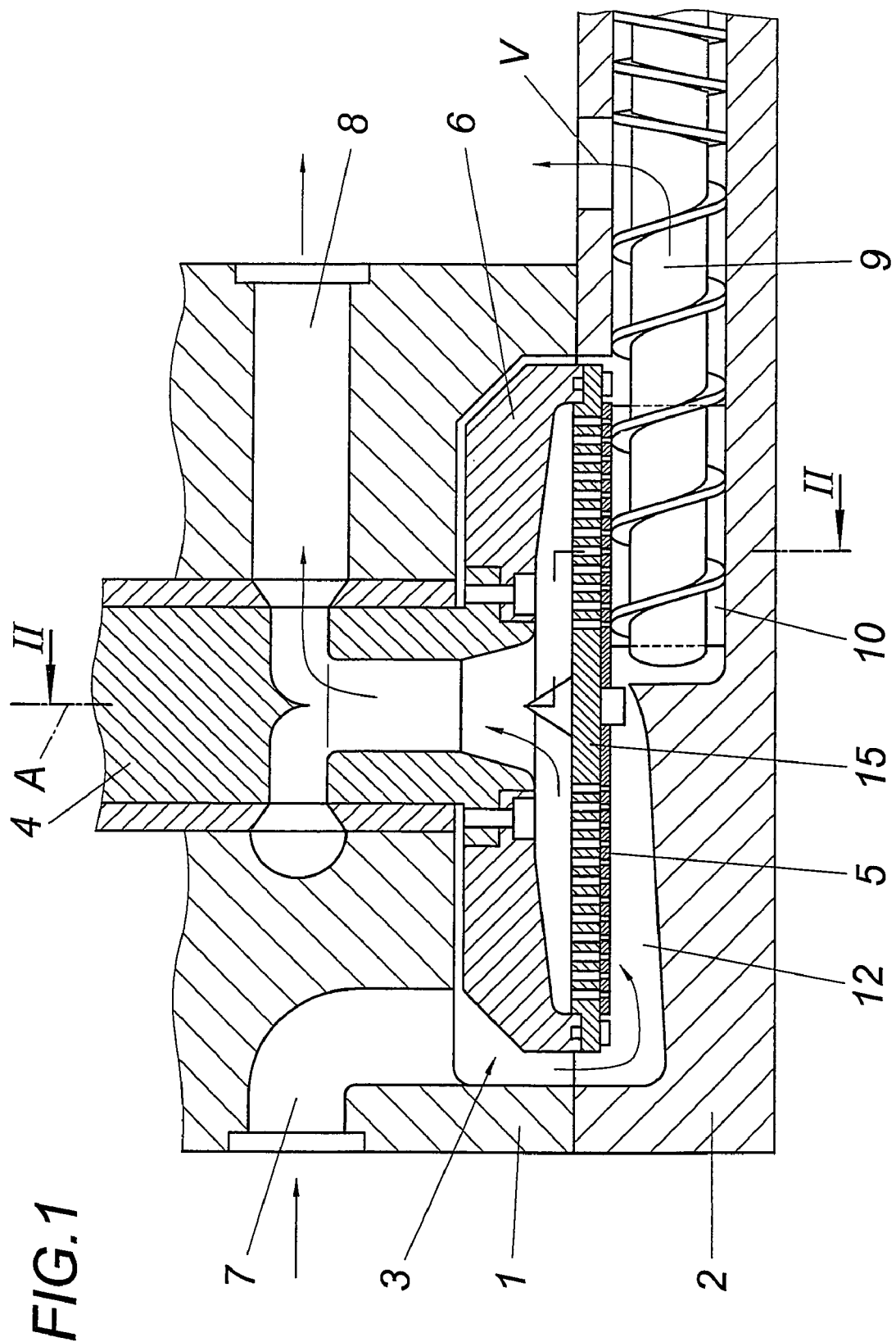
FIG. 1 shows a cross section of an apparatus in accordance with the invention.
Figure 2:
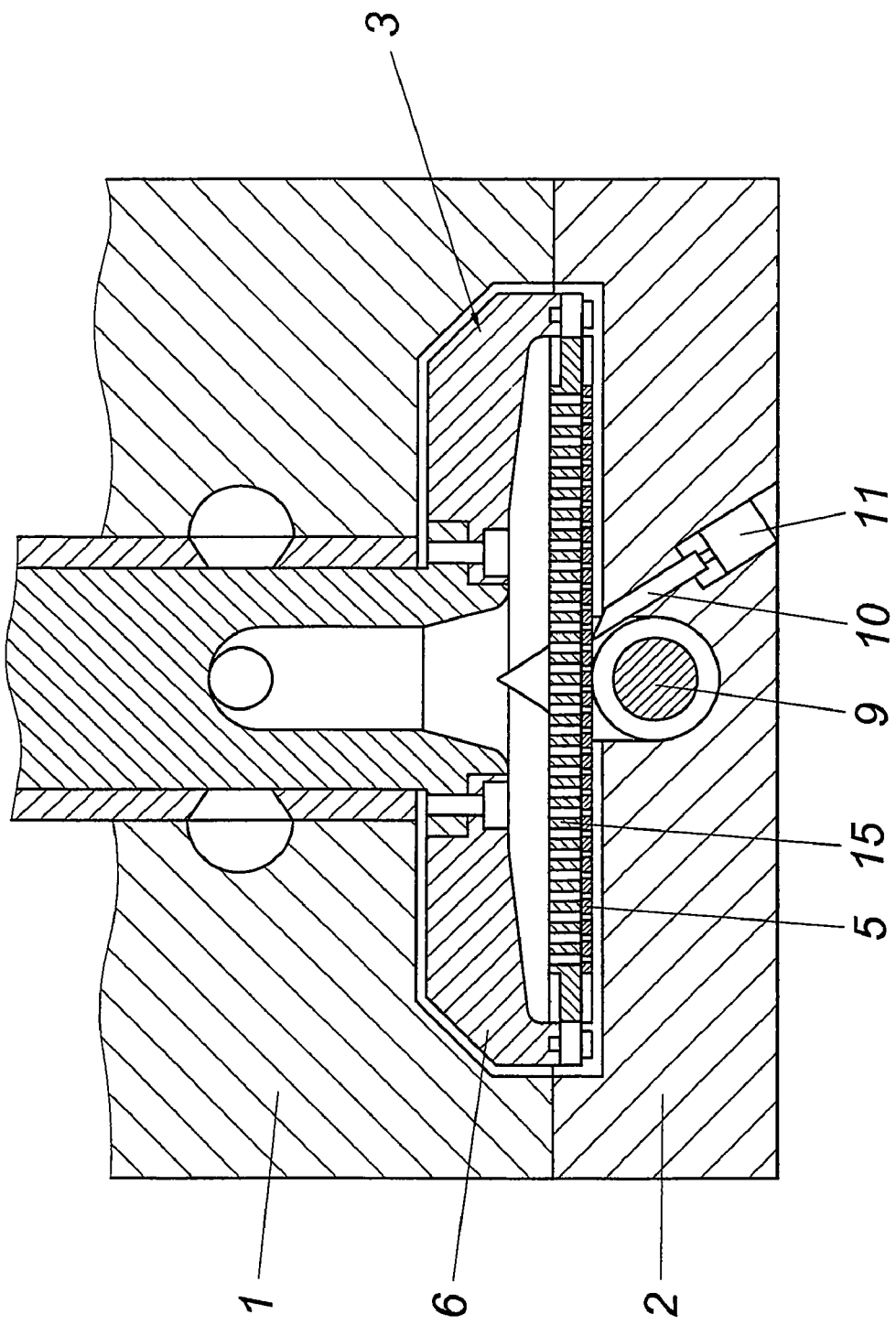
FIG. 2 shows the apparatus of FIG. 1 in a sectional view along line II-II.

An apparatus for the continuous filtering of impurities from a contaminated flowable compound, especially a plastic melt, comprises a housing with two housing halves 1, 2, in which a filter insert 3 is provided in the form of a hollow rotary body which is held in a rotatable manner about its rotational axis A relative to the housing 1, 2 and is flowed through by the flowable manner. Filter insert 3 comprises a filter shaft 4 and a ring disk 6 which is fixed at the end side to the filter shaft 4 and receives a filter disk 5 mounted on a support 15. The filter disk 5 which is arranged on the support 15 is screwed together with the support 15 and ring disk 6, respectively, as also the ring disk 6 with the filter shaft 4. The ring disk 6 and the filter shaft 4 are provided with a hollow arrangement in order to enable the flow of filtered plastic material through the same.

Filter insert 3 is arranged in a flow conduit of the housing 1, 2 between a feed conduit 7 for the compound to be filtered and a discharge conduit 8 for the filtered compound. The filter insert 3 is held to be rotatably driven in the housing 1 with a disk plane arranged perpendicularly to the rotational axis A. The axial bearing receiving the filter forces is not shown in the illustrated embodiment, as is the drive apparatus for the rotary drive of the filter insert 3.

For the continuous cleansing of the filter 5, a discharge apparatus comprising a feed screw 9 cooperating with the filter insert is provided for the impurities V which are retained by the filter 5. For this purpose, a scraper 10 is provided in addition to the feed screw 9 arranged with its rotational axis parallel to the disk plane, which scraper is arranged behind the feed screw 9 in the rotational direction of the filter insert 3 and is applied against the filter, and which forms the screw housing for the feed screw 9 together with the housing half 2 and the filter disk 5. A pressing device 11 such as a spring assembly is provided for the scraper 10, which pressing device presses the same against the filter 5.

The feed conduit 7 opens into a ring conduit 12 which feeds the filtrate to the filter 5 and which tapers in the rotational direction of the filter insert 3 towards the filter 5 (similar to an Archimedean spiral). Of the two housing parts which are detachably connected with each other, the one housing part 1 receives the filter insert 3 and the other housing part 3 the discharge apparatus. This leads to the advantage that directly after the opening of the locking elements between the two housing parts 1, 2 and after the opening of the housing the filter 5 and the discharge screw 9 and scraper 10 are exposed for maintenance purposes.

The contaminated plastic compound to be filtered is introduced through conduit 7 into the apparatus and transferred from there via the ring conduit 12, the disk-like filter 5 and the cavity of the filter insert 3 arranged as a rotary body to discharge conduit 8 and removed in a cleaned state from the apparatus. The filtering is ensured by the disk-like filter 5 which preferably consists of sheet steel and comprises holes bored by means of laser or electron rays. During the filtering process, filter 5 rests on the ring disk 6 and, via filter shaft 4 on the bearing (not shown in closer detail). Filter 5 could also be arranged on the opposite side of the ring disk 6, i.e. in the vicinity of the filter shaft 4 or on both sides of the ring disk 6. Filter insert 3 is made to rotate during the filtering process, the compound is pressed through the filter 5 and impurities are scraped off from the filter by means of scraper 10 and discharged from the housing by the discharge screw 9. The direction of rotation of the discharge screw 9 can be the same relative to the filter 5 or opposite of the same.

The invention claimed is:

1. An apparatus for the continuous filtering of impurities from a plastic melt, comprising a filter insert in the form of a hollow rotary body held to rotate about a rotational axis of the filter insert relative to a housing, wherein the plastic melt flows through the filter insert, the filter insert is arranged in a flow conduit of the housing between a feed conduit for the plastic melt to be filtered and a discharge conduit for the filtered plastic melt, and a discharge apparatus for impurities held back by the filter insert, said discharge apparatus comprising a feed screw cooperating with the filter insert, wherein the filter insert comprises a disk-like filter arranged on a face side of the hollow rotary body and coaxial to the rotational axis, wherein the feed screw is optionally arranged with multiple threads and comprises a first scraper set against the disk-like filter, wherein the discharge apparatus further comprises at least one second scraper arranged behind the feed screw in a direction of rotation of the filter insert and pressed against the disk-like filter, and wherein the feed conduit opens into a ring conduit, the ring conduit guiding the filtrate to the disk-like filter and tapering towards the disk-like filter in the direction of rotation of the filter insert.

2. An apparatus according to claim 1, wherein the filter insert is positioned in a way with respect to the housing that allows the filter insert to be rotated, the filter insert having a disk plane arranged perpendicular to the rotational axis.

3. An apparatus according to claim 1, wherein the housing forms at least two housing parts detachably connected with each other, with one housing part of the at least two housing parts receiving the filter insert and the other housing part of the at least two housing parts receiving the discharge apparatus.

4. An apparatus according to claim 1, wherein a pressing device is provided for the at least one second scraper, wherein said pressing device presses the at least one second scraper against the disk-like filter.

* * * * *